US006651968B2

(12) United States Patent
Reyes

(10) Patent No.: US 6,651,968 B2
(45) Date of Patent: Nov. 25, 2003

(54) PORTABLE COLLAPSIBLE ENGINE SUPPORT APPARATUS

(76) Inventor: Alfred D. Reyes, 5201 Mt. Rushmore, El Paso, TX (US) 79904

(*) Notice: Subject to any disclaimer, the term of this patent is extended or adjusted under 35 U.S.C. 154(b) by 0 days.

(21) Appl. No.: 09/973,922

(22) Filed: Oct. 11, 2001

(65) Prior Publication Data

US 2003/0071403 A1 Apr. 17, 2003

(51) Int. Cl.[7] .................................................. B23Q 1/00
(52) U.S. Cl. ......................... 269/46; 212/180; 212/338; 212/314; 212/316; 180/298; 180/64 R; 254/100; 254/139.1; 254/323
(58) Field of Search ............................. 269/46, 47, 17, 269/71; 414/917, 743; 254/8 B, 9 B, 10 B, 8 F, 139.1; 180/67 R

(56) References Cited

U.S. PATENT DOCUMENTS 4,030,705 A * 6/1977 Bontrager ................ 254/139.1
5,456,371 A * 10/1995 Klann ........................ 212/338
5,782,459 A * 7/1998 Klann ........................ 254/233
6,435,360 B1 * 8/2002 Buchmeier .................. 212/180

* cited by examiner

*Primary Examiner*—Joseph J. Hail, III
*Assistant Examiner*—Daniel Shanley
(74) *Attorney, Agent, or Firm*—Alfred F. Hoyte, Jr.

(57) ABSTRACT

A portable, collapsible engine support apparatus. The device is attachable to the fender or firewall of the vehicle and is mountable either transversely or longitudinally above the engine compartment. A pair of primary load bearing metal angles are secured on opposite sides of the open engine compartment on either the fender or firewall. A pair of upstanding posts approximately centrally positioned on the upward facing surface of the angle, each of the upstanding posts including connection means adapted to lockingly receive horizontal support bars. A central connector allows for adjustment of the spacing between the metal angles. A flexible, adjustable attachment means depends from the central connector, the attachment means adaptable for engagement with the main engine hold. Adjustment of the attachment means to a desired tension ensures a high degree of positional stability of the engine when performing major repairs.

5 Claims, 2 Drawing Sheets

PORTABLE COLLAPSIBLE ENGINE SUPPORT APPARATUS

BACKGROUND OF THE INVENTION

The present invention relates to automotive repair accessories. More particularly, it relates to an engine support apparatus which stabilizes the engine to allow removal of the transmission and facilitate other major repair procedures.

STATEMENT OF THE PRIOR ART

Engine hoists and other devices useful for the removal or stabilization of the engine or other major vehicular components are quite well known in the art. These devices are generally stationary, designed for professional use in repair facilities. Not infrequently, the devices are actually fixtures at repair facilities, and are put to use by bringing the vehicle in proximity thereto. Thus, while engines, transmission and transaxle structures are currently removable from vehicles with multiple equipments and steps, as by portable lifting dollies and cradle handlers and engine support bars, etc., such conventional means of disassembly usually have dictated separation of engine and transmission or engine and transmission/transaxle, and lifting the engine out of the vehicle. From this point, transmission/transaxle suspension components were removed separately as warranted. The increasing complexity and diminutive space accorded unibody vehicular power plants, however, has made complete drive-train removal necessary to facilitate repair operations, both in the autobody and mechanical fields.

While such devices and procedures are generally satisfactory for performing their intended tasks, they suffer from several drawbacks. First, the vast majority of the relatively large, stationary devices are much too expensive for the average auto enthusiast or home mechanic, the cost of these devices being readily absorbed by professionals and repair shops as a normal cost of doing business. Secondly, the devices simply are not compact and portable enough to allow easy storage in a limited space. Finally, the portable devices that do exist are generally marginally safe, or are designed for use only with particular vehicles or vehicles having features which accommodate the device.

U.S. Pat. No. 4,846,451 issued to Donald M. Squier discloses a portable engine removal structure having integral frame and supporting members for holding the transaxle, engine, suspension and transmission systems as a unitary structure for facile removal from the vehicle and replacement therein. The device is quite large and not apparently collapsible, although portable by virtue of the fact that it has wheels. By contrast, the present invention contemplates a collapsible support apparatus which facilitates stabilization of the engine while effecting a major repair or removal of the transmission.

SUMMARY OF THE INVENTION

The present invention contemplates a portable, collapsible engine support apparatus. The device is attachable to the fender or firewall of the vehicle and is mountable either transversely or longitudinally above the engine compartment. A pair of primary load bearing metal angles are secured on opposite sides of the open engine compartment on either the fender or firewall. A pair of upstanding posts approximately are centrally positioned on the upward facing surface of the angle, each of the upstanding posts including connection means adapted to lockingly receive horizontal support bars. A central connector allows for adjustment of the spacing between the metal angles. A flexible, adjustable attachment means depends from the central connector, the attachment means adaptable for engagement with the main engine hold. Adjustment of the attachment means to a desired tension ensures a high degree of positional stability of the engine when performing major repairs.

Accordingly, it is a principal object of the invention to provide an improved engine support apparatus.

It is another object of the invention to provide an improved engine support apparatus which is portable and collapsible.

It is another object of the invention to provide an improved engine support apparatus which can be set up by a single person.

It is another object of the invention to provide an improved engine support apparatus having a tensioning means for attachment to an automobile engine to improve positional stability of the engine during major repairs.

Finally, it is a general object of the invention to provide improved elements and arrangements thereof in an apparatus for the purposes described which is fully effective in accomplishing its intended purpose.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2(*b*) shows the apparatus of FIG. 1 mounted in accordance with an alternative mounting scheme.

DETAILED DESCRIPTION

Figure 1:
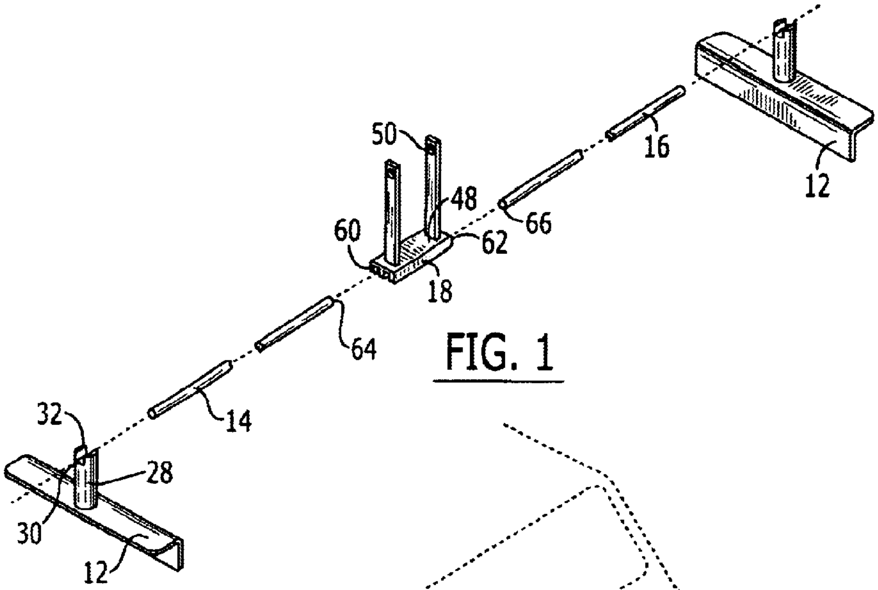
FIG. 1 shows an exploded perspective view of the engine support apparatus of the present invention.
Figure 2A:
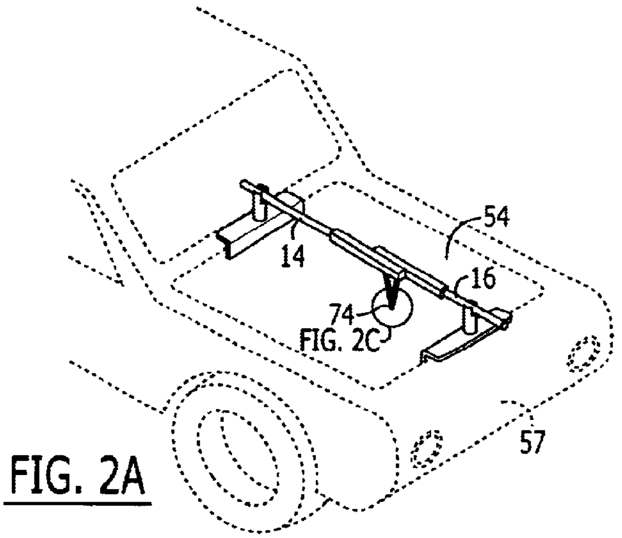
FIG. 2(*a*) shows the apparatus of FIG. 1 mounted in accordance with a first mounting scheme.
Figure 2B:
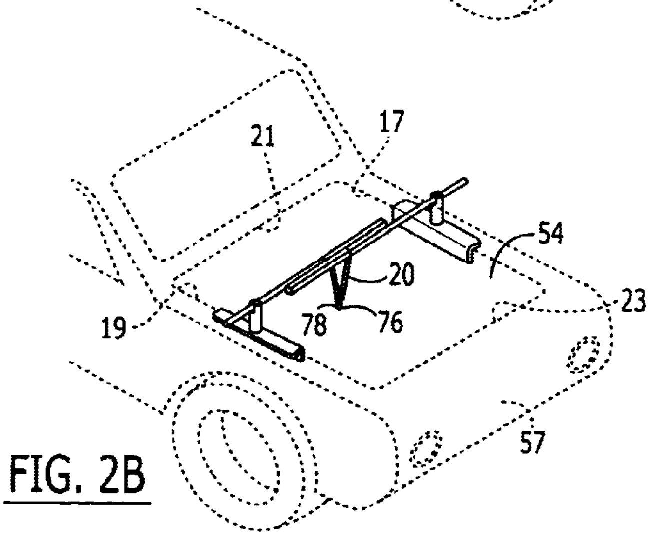
Figure 2C:
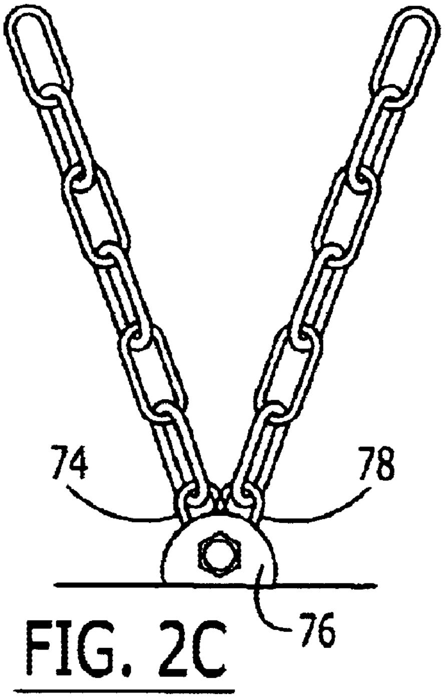
Figure 3:
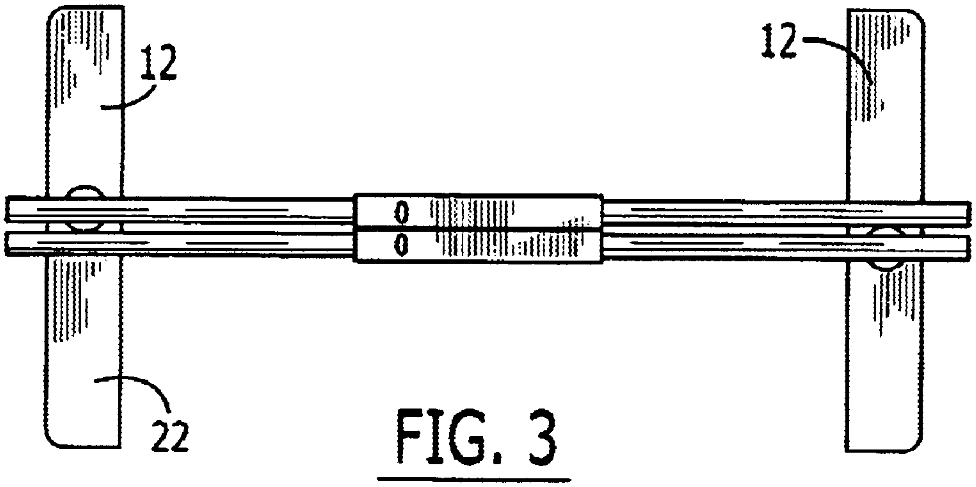
FIG. 3 shows a top view of the apparatus of FIG. 1.

Referring now to FIGS. 1–3, the apparatus of the present invention, generally indicated by the numeral 10, is shown. The vehicle 11, which may be a light truck or car, has an engine 13 located within an engine compartment 15. The interior of the engine compartment 15 of all vehicles 11 having opposing fenders 17, 19, a firewall 21 and front fender 23. The fenders 17, 19, 23, and firewall 21 provide support surfaces for installation of the apparatus 10 as will be explained in more detail later.

The apparatus 10 comprises four main components; primary load bearing metal angles 12, horizontal support bars 14, 16, central connector 18, and adjustable tensioning chain 20. The four components, when disassembled, are extremely compact and may be stored in the trunk of most vehicles, including sub-compacts. Also, the components are sized so that the weight of the apparatus 10 is minimal.

The load bearing metal angles 12 are preferably made of high strength steel and have two planar support members 22, 24 connected at an approximately 90 degree angle. Preferably the support members 22, 24 are fashioned from a single sheet of metal as is well known in the art. An upstanding post 28 extends from the upper surface of an approximately central area of support members 22, 24. A locking collar 30 and bolt hole 32 are sized to receive and lockingly engage support bars 14, 16. Bolt hole 32 is preferably arranged on the top surface of the locking collar 30 to facilitate tightening of bolts 36 as will be explained in more detail later.

Identical horizontal support bars 14, 16 are also formed of solid high strength steel or other metal. The support bars 14, 16, which are preferably three to five feet in length, have a diameter of approximately 1 inch to ensure sufficient load bearing capacity. As can be seen in FIG. 1, each locking collar 30 is sized to receive only one of the support bars 14, 16 which extend from the locking collar 30 to central connector 18 when the support apparatus 10 is assembled as will be discussed in reference to the method of assembly.

Central connector 18 has a substantially rectangular main body 40 with adjacent bores 42, 44 formed therein. Connector 18 may be formed from a pair of square tubes welded together. Of course, the inner dimensions of the bores 42, 44 should be sized to allow for sliding engagement of horizontal support bars 14, 16 therewithin. Threaded bolt holes 48 are sized for threaded engagement with bolts 50 which serve to lock the support bars 14, 16 in position at a desired overlapping axial extension, the amount of extension determined by the width or length of the engine compartment 54 of the vehicle 57 as is illustrated in FIGS. 2*a* and 2*b*.

Installation of the apparatus 10 is accomplished by first inserting support bars 14, 16 into and through opposing ends 60, 62 of the central connector 18 so that the bars 14, 16 lay adjacent in parallel relation. The length of the support bars 14, 16 should be chosen such that interior ends 64, 66 will be overlapping in the axial direction regardless of the adjustment made to accommodate the engine compartment 15 of the vehicle. Bars 14, 16 having a length of five feet would ensure an axial or lateral overlapping, but such a length may be two long for very small vehicles. In one aspect of the invention, the apparatus may be packaged with tow sets of support bars, over for large vehicles, and the other for compact and sub compacts. The horizontal support bars 14, 16 may overlap entirely so that they are mutually parallel as shown in FIG. 3. The metal angles 12 are then positioned on the left and right fenders 17, 19 of the vehicle 11 as shown in FIG. 2*b* if a transverse arrangement is desired. Alternatively, metal angles 12 are positioned on the firewall fender 21 and an interior ledge 70 of the front fender 23. Care must be taken to ensure stability of the angles 12 when they are positioned, and a determination of the load bearing capacity of any surface upon which the load bearing angles 12 are positioned must be made. Tensioning chain 20, which has a hook 74 at one end is placed over and around the central connector 18, with hook 74 engaged with the main engine hold 76. If the vehicle 57 has no main engine hold. Then a bolt can be removed from the heads (not shown) and the tensioning chain 20 can be bolted to the head. Chain 20 is then tightened about central connector 18, and a bolt 78 is placed through an appropriate pair of links in the chain 20 to secure the engine.

Disassembly is accomplished in approximately the reverse order, with bolt 78 removed to ensure that the apparatus 10 is no longer bearing the weight of the vehicle engine. The chain 20 may then be removed entirely from the assembly, and the horizontal support bars 14, 16, central connector 18, and metal angles 12 may be disconnected and stored as desired. Storage of the apparatus 10 is easily accomplished, as has been previously mentioned, in the trunk of the vehicle 57. For example, metal angles 12, central connector 18, chain 20, and all nuts and bolts may be placed within the vehicle 57 trunk's spare tire depression. Even a compact vehicle having a space saving tire can easily accomodate all of the components except the horizontal support bars 14, 16.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. An engine support apparatus for positional stabilization of an engine mounted in a vehicle engine compartment comprising:

an opposing pair of primary load bearing members adapted for load bearing engagement on correspondingly opposing interior support areas within said vehicle engine compartment;

each of said load bearing members having an upstanding post extending vertically from a substantially central area of an upward facing surface, each of said upstanding posts having a connection means adapted for locking engagement with distal ends of each one of a pair of horizontal support bars;

a central connecting member having apertures within which proximal ends of said horizontal support bars may be slidably received, said central connecting member including locking means for holding said support bars in position;

an attachment means depending from said central connecting member and connectable to said engine in a load bearing capacity, said attachment means including adjustable tensioning means.

2. The apparatus of claim 1 wherein said attachment means is a chain having a plurality of links and a connection means depending from one end.

3. The apparatus of claim 1 wherein said horizontal support members depend from the connection means of the respective upstanding posts into opposite ends of separate ones of the adjacent bores of the central connecting member.

4. The apparatus of claim 1 wherein said primary load bearing members are spaced in accordance with spacing between said opposing inferior support areas, and wherein said horizontal support bars may be laterally adjusted in accordance with said spacing.

5. The apparatus of claim 1 wherein said horizontal support bars are in partial overlapping relation.

* * * * *